US009537366B2

United States Patent
Hikita

(10) Patent No.: US 9,537,366 B2
(45) Date of Patent: Jan. 3, 2017

(54) MAGNET-TYPE GENERATOR

(71) Applicant: Takahiko Hikita, Mie (JP)

(72) Inventor: Takahiko Hikita, Mie (JP)

(73) Assignee: Denso Trim Co., Ltd., Mie-gun, Mie (JP)

( * ) Notice: Subject to any disclaimer, the term of this patent is extended or adjusted under 35 U.S.C. 154(b) by 273 days.

(21) Appl. No.: 14/338,350

(22) Filed: Jul. 23, 2014

(65) Prior Publication Data
US 2014/0333165 A1 Nov. 13, 2014

Related U.S. Application Data

(63) Continuation of application No. PCT/JP2013/052745, filed on Feb. 6, 2013.

(30) Foreign Application Priority Data

Feb. 10, 2012 (JP) .................................. 2012-027641

(51) Int. Cl.
*H02K 3/52* (2006.01)
*H02K 3/28* (2006.01)
(Continued)

(52) U.S. Cl.
CPC ............... *H02K 3/522* (2013.01); *H02K 1/27* (2013.01); *H02K 1/2786* (2013.01); *H02K 3/28* (2013.01);
(Continued)

(58) Field of Classification Search
CPC ...... H02K 3/522; H02K 21/22; H02K 21/222; H02K 1/2786; H02K 2203/12
(Continued)

(56) References Cited

U.S. PATENT DOCUMENTS

| 4,287,446 A * | 9/1981 | Lill | ........................ | H02K 3/28 |
| | | | | 310/71 |
| 5,635,781 A * | 6/1997 | Moritan | ................... | H02K 3/18 |
| | | | | 310/216.005 |

(Continued)

FOREIGN PATENT DOCUMENTS

JP  S60-213254 A  10/1985
JP  S61-007276 U   1/1986
(Continued)

OTHER PUBLICATIONS

International Search Report for PCT/JP2013/052745 dated May 7, 2013.
PCT written opinion dated May 7, 2013.

*Primary Examiner* — Burton Mullins
(74) *Attorney, Agent, or Firm* — Yokoi & Co., U.S.A.; Toshiyuki Yokoi

(57) ABSTRACT

A magnet-type generator 1 has a stator 20 having a stator core 21, bobbins 40, 41 and a coil 60. The stator core has through holes 35A, 35B, 35C passing through the stator core parallel to a rotation axis of the rotor so that lead wires 64A, 64B, 64C for outputting current generated at the magnet-type generator 1, which are corresponding to respective phases, are inserted into the through holes. The lead wires inserted into the through holes are connected with outgoing wires 60a, 60c', 60b, 60a', 60c, 60b' of the coil at one side (clamping surface side) of the stator core 21 via a terminal (metal connection terminal) 53 fixed to a substrate portion (plate portion) 48 extending from the bobbin. The terminal is arranged near the through holes.

9 Claims, 15 Drawing Sheets

(51) Int. Cl.
  *H02K 5/22* (2006.01)
  *H02K 1/27* (2006.01)
  *H02K 3/34* (2006.01)
  *H02K 21/22* (2006.01)

(52) U.S. Cl.
  CPC .............. *H02K 3/345* (2013.01); *H02K 5/225* (2013.01); *H02K 21/22* (2013.01); *H02K 2203/06* (2013.01); *H02K 2203/12* (2013.01); *H02K 2213/03* (2013.01)

(58) Field of Classification Search
  USPC ........ 310/70 R, 71, 153; 322/52; 123/149 D, 123/149 R
  See application file for complete search history.

(56) References Cited

U.S. PATENT DOCUMENTS

| | | | | |
|---|---|---|---|---|
| 6,030,260 | A * | 2/2000 | Kikuchi | H01R 39/32 310/71 |
| 6,091,172 | A * | 7/2000 | Kakinuma | H02K 11/40 310/194 |
| 6,137,198 | A * | 10/2000 | Kawamura | H02K 3/522 310/71 |
| 6,333,579 | B1 * | 12/2001 | Hirano | H02K 1/146 310/194 |
| 6,392,311 | B2 * | 5/2002 | Inaba | 290/31 |
| 6,583,529 | B2 * | 6/2003 | Suzuki | H02K 3/28 310/199 |
| 7,492,067 | B2 * | 2/2009 | Kotajima | H02K 3/522 29/597 |
| 7,501,729 | B2 * | 3/2009 | Takeuchi | H02K 3/522 310/179 |
| 7,868,496 | B2 * | 1/2011 | Fujii | H02K 3/522 310/179 |
| 8,040,003 | B2 * | 10/2011 | Takahashi | H02K 3/522 310/184 |

FOREIGN PATENT DOCUMENTS

| | | |
|---|---|---|
| JP | S61-022744 A | 1/1986 |
| JP | H08-111969 A | 4/1996 |
| JP | 2003-259586 A | 9/2003 |
| JP | 2005-341640 A | 12/2005 |
| JP | 2010-273482 A | 12/2010 |

* cited by examiner mounting surface side

MAGNET-TYPE GENERATOR

CROSS-REFERENCES TO RELATED APPLICATIONS

This Application claims the benefit of priority and is a Continuation application of the prior International Patent Application No. PCT/JP2013/052745, with an international filing date of Feb. 6, 2013, which designated the United States, and is related to the Japanese Patent Application No. 2012-027641, filed Feb. 10, 2012, the entire disclosures of all applications are expressly incorporated by reference in their entirety herein.

BACKGROUND OF THE INVENTION

1. Field of the Invention

The present invention relates to a magnet-type generator mounted on an engine of a two-wheel vehicle (motorcycle), a buggy, a jet ski bike, or the like in order to charge a battery or for other purposes.

2. Description of Related Art

In stators of magnet-type generators having an outer rotor-inner stator configuration, as shown in FIG. 15, the following structure is adopted to connect outgoing wires of a coil with lead wires for outputting power to outside the generator. A through-hole 102 is formed on an annular base portion 101 located at a center of a stator 100, a tubular insulator 105 formed together with a bobbin 104 is inserted into the through-hole 102 to cover an inner surface of the through-hole 102, lead wires 107A, 107B, 107C are inserted into the through-hole 102 covered with the tubular insulator 105 from the side of a mounting surface 100a of the stator 100 (mounting surface side on an engine cover, a side shown in FIG. 15A), and the lead wires 107A, 107B, 107C, which are corresponding to a plurality of phases, are connected with outgoing wires 108A, 108B, 108C of a coil 108 at the side of a clamping surface 100b of the stator 100 (opposite surface of the mounting surface side, a side shown in FIG. 15B). Note that the above explained conventional structure is disclosed in Japanese Unexamined Patent Application Publication No. 2010-273482.

In the above explained structure of connecting wires, the lead wires 107A, 107B, 107C, which are corresponding to a plurality of phases, are inserted into the through-hole 102 and therefore, as shown in FIG. 15B, the lead wires 107A, 107B, 107C pulled out of the through-hole 102 should be complicatedly arranged so as to reach near the outgoing wires 108A, 108B, 108C at one side of the stator 100 (side of clamping surface 100b). Therefore, it is desired that workability of wire connection and vibration resistance of the lead wires 107A, 107B, 107C should be improved.

In addition, thicker lead wires compared to the conventional lead wires are often used in recent years to increase the output power of the generator. When using such thick lead wires, it is remarkably inefficient in viewpoint of workability to insert the lead wires of a plurality of phases into one through-hole and complicatedly arrange the lead wires.

The present invention has an aim to provide a magnet-type generator capable of improving the workability to connect the lead wires with the outgoing wires of the coil and improving the vibration resistance.

BRIEF SUMMARY OF THE INVENTION

One aspect of the present invention provides a magnet-type generator comprised of a stator that has a stator core, a bobbin and a coil wound around the bobbin, and a rotor that is arranged outside the stator and has a circumferentially arranged magnet so as to generate an alternating flux, wherein the stator core has an annular base portion of approximately annular shape and salient pole portions extended in a radial direction from the annular base portion, the bobbin is made of an insulating material and mounted on the stator core so as to almost entirely cover a surface of the salient pole portions, the stator core has through holes passing through the stator core along a rotation axis of the rotor so that lead wires for outputting, which are corresponding to respective phases, are individually inserted into the through holes, the lead wires inserted into the through holes are connected with outgoing wires of the coil at one side of the stator core via a metal connection terminal fixed to a plate portion extending from the bobbin, and the metal connection terminal is arranged near the through holes.

In the present aspect, the lead wires are inserted into the through holes which are separately prepared corresponding to respective phases and connected with the outgoing wires of the coil via the metal connection terminal arranged near the through holes. Therefore, the lead wires inserted into the through holes can be connected to the metal connection terminal without arranging the lead wires for a long distance. Consequently, the workability of the connection work can be improved.

In addition, the lead wires are connected to the metal connection terminal arranged near the through holes, and therefore the vibration resistance can be improved compared to a case where the lead wires are pulled out for a long distance and arranged complicatedly.

Furthermore, the lead wires are inserted into the through holes which are separately prepared corresponding to respective phases, and therefore even when a large size generator is used and relatively large amount of current flows through the lead wires, heat can be prevented from being concentrated on one spot and deterioration of the covering of the lead wires can be prevented.

It is preferred that a lead wire connection end portion of the metal connection terminal is arranged along a line connecting the through holes and a center of the annular base portion.

By adopting the above structure, the lead wires inserted into the through holes can be connected to the metal connection terminal without bending the lead wires complicatedly, and therefore the connection work can be easier.

It is preferred that an inner surface of the through holes is covered by a tubular portion which is made of an insulating material and provided on the plate portion.

By adopting the above structure, the lead wires are prevented from directly touching the stator core on which the through holes are provided. Consequently, the covering of the lead wires are prevented from being damaged by a burr of the stator core, for example, and short circuit failure between the lead wires and the stator core can be prevented.

It is preferred that the tubular portion has a chamfered portion formed at least on a side of the metal connection terminal of an outlet portion from which the lead wires are pulled out.

By adopting the above structure, the lead wires inserted into the tubular portion are pulled out from the outlet in accordance with the chamfered portion and therefore the lead wires can be easily bent toward the metal connection terminal to connect the lead wires to the metal connection terminal. In addition, the lead wires are bent toward the metal connection terminal in accordance with the chamfered portion, and therefore the covering of the lead wires are not damaged around the outlet.

It is preferred that a conducting wire of the lead wires is covered by a covering portion made of an insulating material, and a hole diameter of the tubular portion is larger than a diameter of the conducting wire and smaller than a diameter of the lead wires including the covering portion.

By adopting the above structure, the covering portion of the lead wires is pressed against an inner surface of the tubular portion and squeezed when the lead wires are inserted into the tubular portion. Therefore, the lead wires are certainly fixed in the tubular portion and the vibration resistance of the lead wires is improved. Consequently, deterioration of the covering portion, disconnection and short circuit failure, which are caused by the vibration of the lead wires, can be prevented.

It is preferred that a hole of the tubular portion is formed into a rectangular shape.

By adopting the above structure, the covering portion, which is pressed against the inner surface of the tubular portion and squeezed, can be released toward a corner of the tubular portion because the hole is formed into a rectangular shape. Therefore, the insertion of the lead wires becomes easier compared to a case of adopting a hole shape not allowing the covering portion to be released.

It is preferred that a wall portion is prepared on the plate portion projecting from a periphery of the outlet of the tubular portion and along with an insertion direction of the lead wires, and a groove for lead wire having width dimension of smaller than the diameter of the lead wires is formed on the wall portion.

By adopting the above structure, the lead wires pulled out from the outlet of the tubular portion are fit into the groove for lead wire and connected to the metal connection terminal. Therefore, the lead wires are sandwiched by the wall portion. Consequently, rattling of the lead wires is suppressed and the vibration resistance is improved. Note that the shorter a separation distance between a connecting point of the lead wires on the metal connection terminal and the groove for lead wire, which is a point of fixing the lead wires, the more the rattling of the lead wires is suppressed when the generator is vibrated It is preferred that an uplift prevention portion is formed on the wall portion to prevent the read wires from being lifted up from the plate portion.

By adopting the above structure, the lead wires pulled out of the outlet of the tubular portion are prevented from uplifting from the plate portion by the uplift prevention portion. Therefore, the vibration resistance is improved.

By using the magnet-type generator of the present invention, the workability to connect the lead wires with the outgoing wires of the coil can be improved and the vibration resistance of the lead wires can be improved.

DETAILED DESCRIPTION OF THE INVENTION

1. Embodiment

Figure 1:
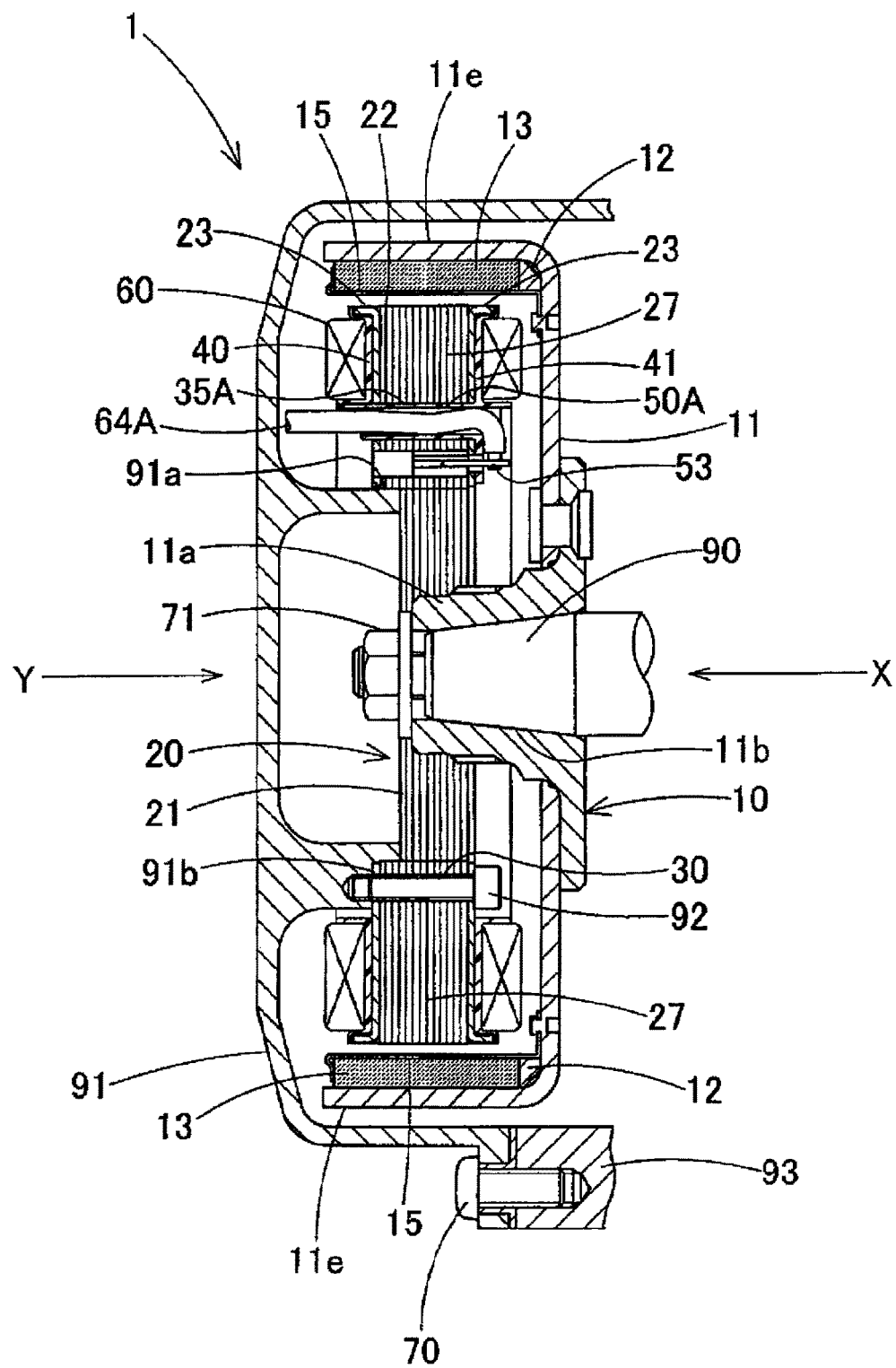
FIG. 1 is a cross-sectional view of a three-phase magnet-type generator mounted on an engine concerning an embodiment of the present invention.

Hereafter, an embodiment of the present invention will be explained based on the drawings. FIG. 1 is a cross-sectional view of a three-phase magnet-type generator concerning an embodiment of the present invention. As shown in FIG. 1, a three-phase magnet-type generator 1 has a rotor 10 that is fixed to a crank shaft 90 of an engine and a stator 20 that is fixed to an engine cover 91 so as to be located at an inner peripheral side of the rotor 10. The engine cover 91 is fixed to an engine body 93 by clamping a screw 70. The number of poles of the rotor 10 is twenty, for example. The number of poles of the stator 20 is fifteen, for example.

The rotor 10 has a rotary member 11 made of a magnetic material. A tapered portion 11b formed at a boss portion 11a of the rotary member 11 is fit into an end of the crank shaft 90 and fixed by a bolt 71. A yoke is formed by a tubular-shaped outer peripheral portion 11e of the rotary member 11.

Inside the outer peripheral portion 11e of the rotary member, a ring-shaped spacer 12 made of a non-magnetic material and a magnet 13 having twenty poles circumferentially arranged at regular intervals are provided along an axis direction of the crank shaft 90. A magnet protection ring 15 is provided inside the magnet 13. The magnet 13 is fixed to an inner periphery of the outer peripheral portion 11e. Note that the magnet protection ring 15 is formed by pressing a stainless plate.

Figure 2:
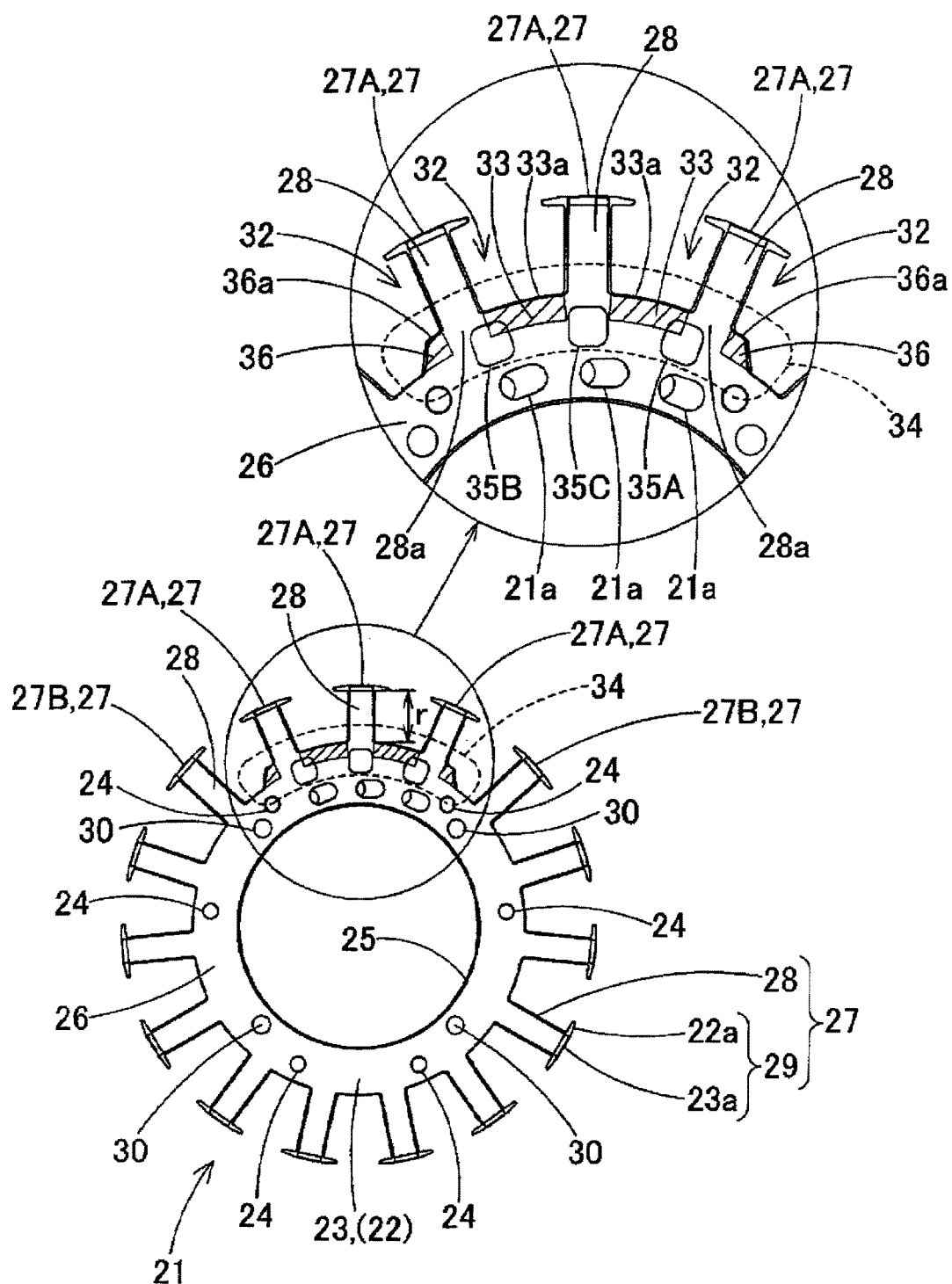
FIG. 2 is a plain view of a core of a stator of the generator.
Figure 3A:
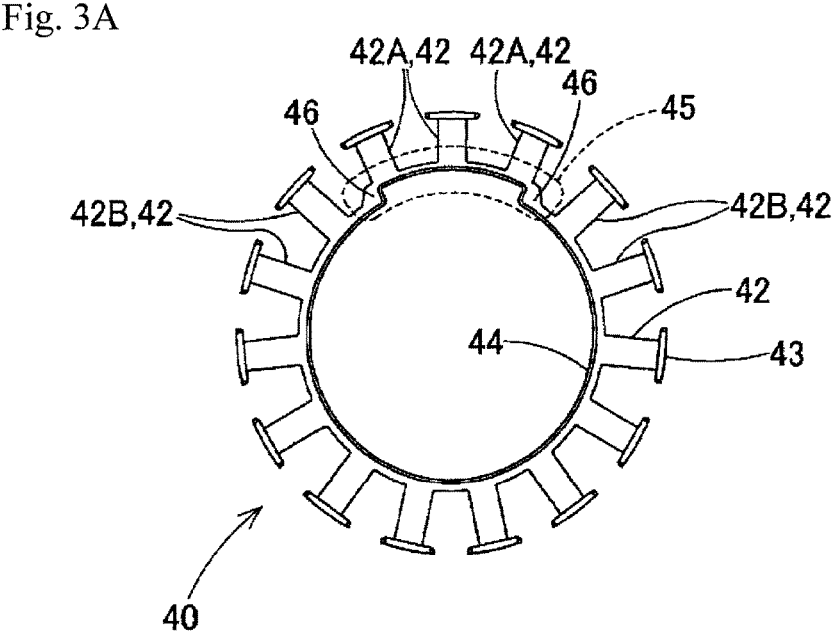
FIG. 3A is a plan view of a bobbin which is mounted on the core of the stator from a mounting surface side.
Figure 3B:
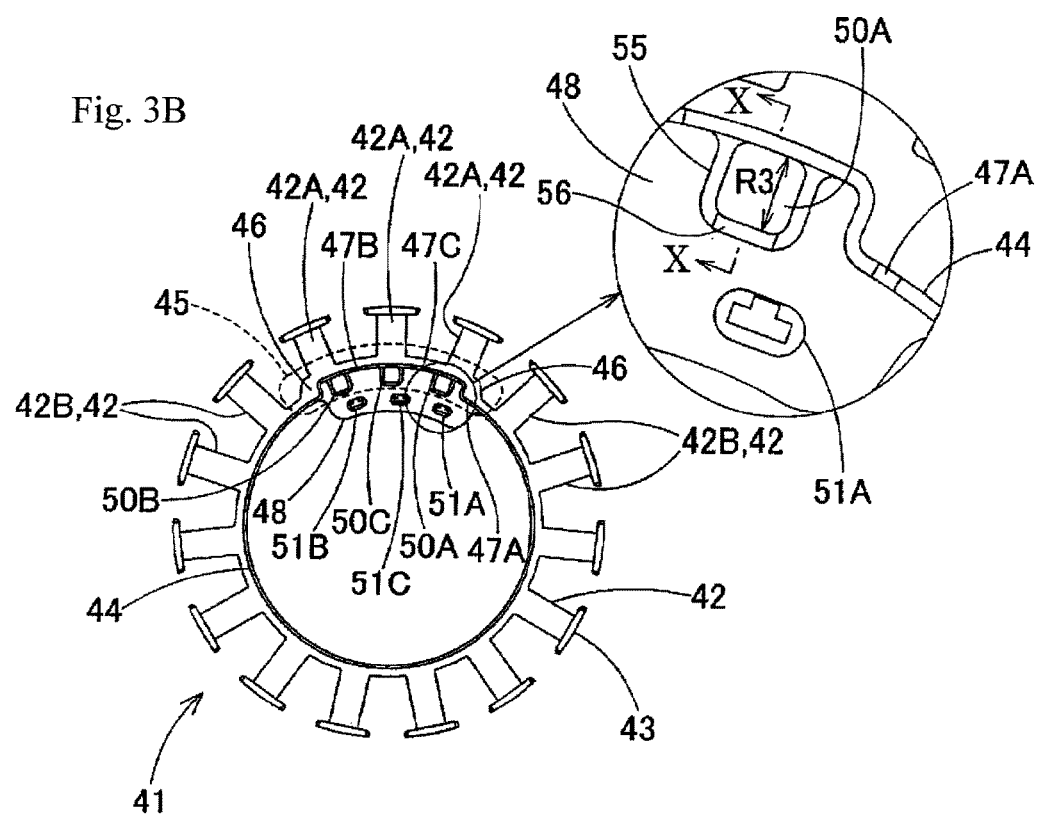
FIG. 3B is a plan view of a bobbin which is mounted on the core of the stator from a clamping surface side.
Figure 4:
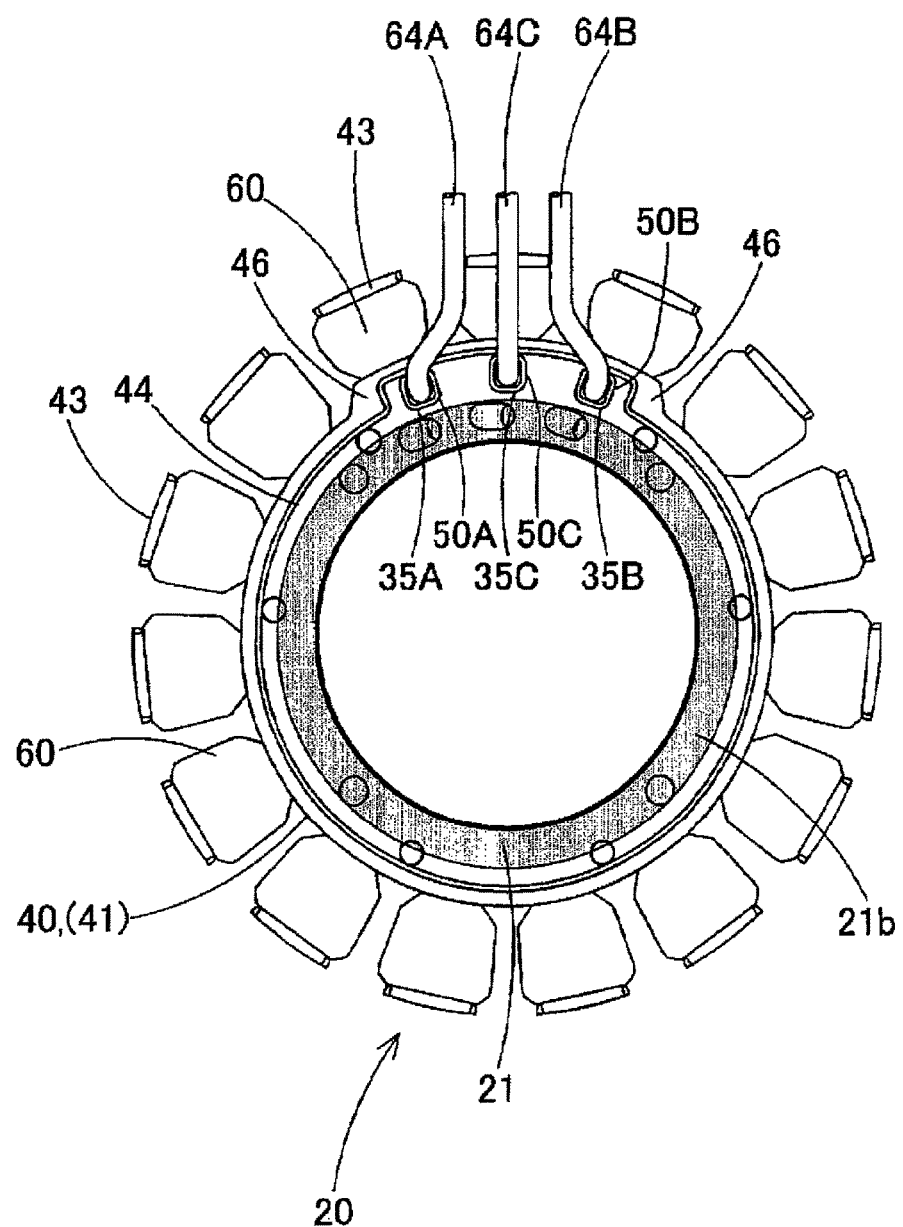
FIG. 4 is a view of the stator seen from an arrow Y of FIG. 1.
Figure 5:
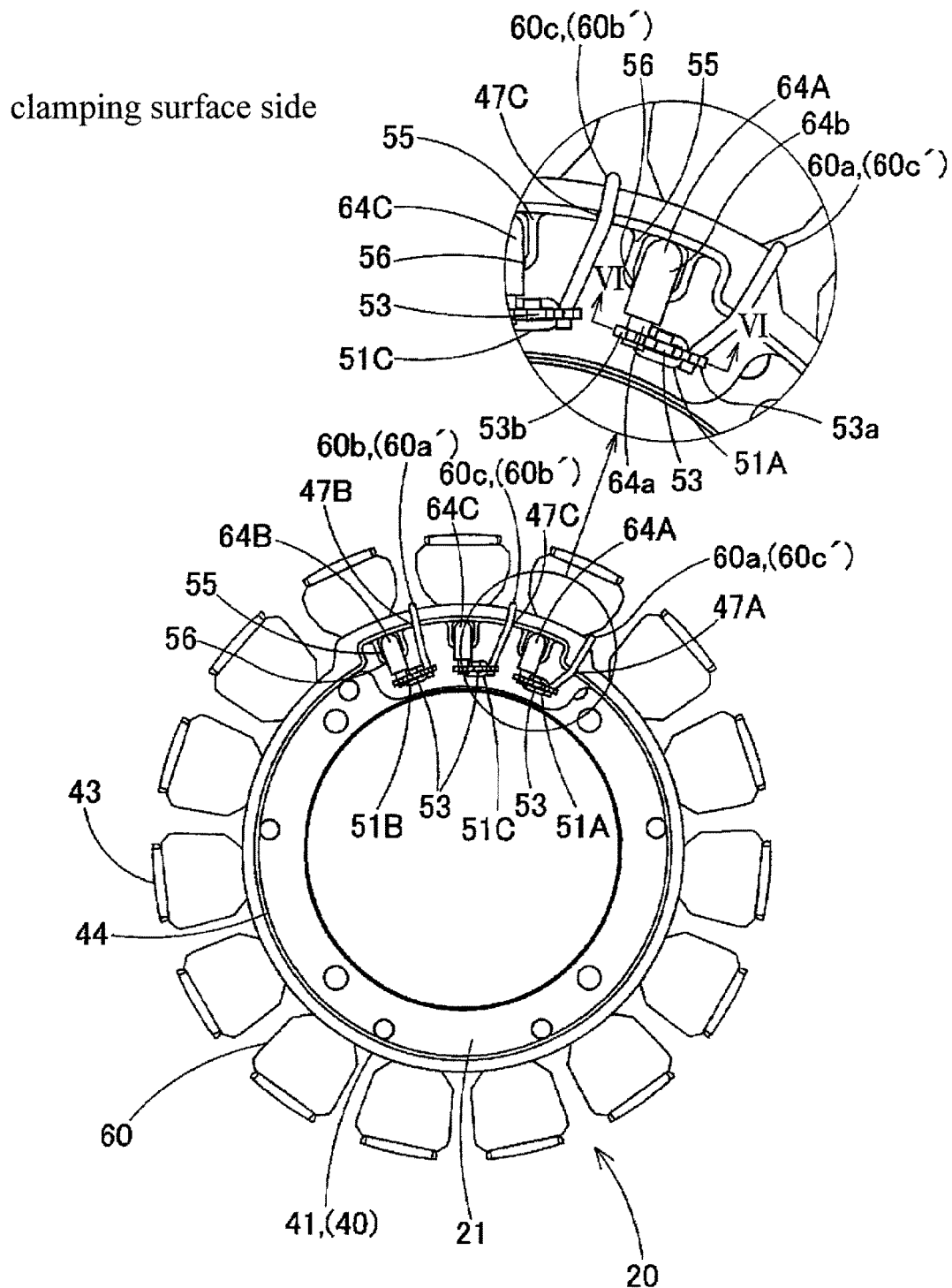
FIG. 5 is a view of the stator seen from an arrow X of FIG. 1.

Next, the stator 20 will be explained based on FIGS. 2 to 5. FIG. 2 shows a stator core 21 of the stator 20. FIG. 3A shows a mounting surface side bobbin 40 mounted on the stator core 21 from a mounting surface side (side of the engine cover 91). FIG. 3B shows a clamping surface side bobbin 41 mounted on the stator core 21 from a clamping surface side (side of the engine body 93). FIG. 4 shows the mounting surface side of the stator 20 in a state that the bobbins 40, 41 are fit to the stator core 21 and a coil 60 is wound around the bobbins 40 and 41. FIG. 5 shows a clamping surface side of the stator 20 in a state that the bobbins 40, 41 are fit to the stator core 21 and the coil 60 is wound around the bobbins 40, 41.

As shown in FIGS. 1 and 2, the stator 20 has the stator core 21, two bobbins 40, 41 which are resin molded and fit to the stator core 21 so as to sandwich the stator core 21 from both sides, and the coil 60 which is wound around the bobbins 40, 41 mounted on the stator core 21.

The stator core 21 is formed by laminating stator core sheets 22 and fastening the laminated stator core sheets 22 and two stator core end plates 23, which are arranged to sandwich the stator core sheets 22 from both sides, with rivets 24 to integrate them together. The stator core sheets 22 are formed by press punching a rolled steel plate. The stator core end plates 23 are formed by pressing a steel plate, which is a little thicker than the stator core sheets 22.

The stator core 21 has an inner bore portion 25 which is fit to an annular fitting portion 91a provided on the engine cover 91, an annular base portion 26 which is extended outward from the inner bore portion 25, and fifteen salient pole portions 27 which are extended in a radial direction from the annular base portion 26 so as to be arranged at regular intervals. Each of the salient pole portions 27 has a winding frame portion 28 and a magnetic pole portion 29 which is extended from a tip of the winding frame portion 28. A plurality of the magnetic pole portions 29 is facing the magnet 13 of the rotor 10.

On the annular base portion 26, four clamping hole portions 30 are formed to insert clamping bolts 92, which are screwed into mounting seats 91b of the engine cover 91 to fix the stator 20 to the engine cover 91.

In addition, the stator core 21 has an extension portion 33 which is extended outward from the annular base portion 26 so as to fill gaps 32 between the salient pole portions 27. In the present specification, the outward means a direction from the center of the annular base portion 26 to the outer peripheral edge. The extension portion 33 fills a part of two gaps 32 formed by three continuous salient pole portions 27 at a side of the annular base portion 26. In other words, the extension portion 33 is a part of the annular base portion 26 whose outer periphery is partly enlarged outwards and fills a part of the gaps 32 between at least two neighboring silent pole portions 27.

Here, an area enclosed by broken line in FIG. 2, which includes the extension portion 33, is referred to as a salient portion 34. On the salient portion 34, three through holes 35A, 35B, 35C are arranged at almost same position in a circumferential direction so as to insert tubular portions 50A, 50B, 50C (shown in FIG. 3B), which are formed on the later mentioned clamping surface side bobbin 41. The through holes 35A, 35B, 35C pass through the stator core 21 from the clamping surface side to the mounting surface side. The holes 35A, 35B, 35C are approximately rectangular shape when seen in cross-section perpendicular to the direction of passing through.

Since the stator 20 has the salient portion 34 as explained above, a radial direction length r (shown in FIG. 2) of the winding frame portion 28 is shorter than that of other salient pole portions 27 at three of fifteen salient pole portions 27 of the stator 20. Hereafter, the salient pole portions 27 that have the winding frame portion 28 of shorter radial direction length are referred to as a specific salient pole portion 27A, while the salient pole portions 27 other than the specific salient pole portions 27A are referred to as a normal salient pole portion 27B. The normal salient pole portion 27B is corresponding to "other salient pole portion" in the claims.

Out of the three continuing specific salient pole portions 27A, on two specific salient pole portions 27A neighboring to the normal salient pole portions 27B, an overhang portion 36 is formed at base portions 28a (side of the annular base portion 26) to extend outward so as to fill the gaps 32 between the specific salient pole portions 27A and the normal salient pole portions 27B. An outer end 36a of the overhang portion 36 is located at same position as an outer end 33a of the extension portion 33 in a circumferential direction.

As shown in FIG. 2, the magnetic pole portion 29 of the salient pole portion 27 is formed by a magnetic pole body portion 22a of the stator core sheet 22 and a flange portion 23a of the stator core end plate 23. The flange portion 23a of the stator core end plate 23 extends approximately perpendicular to the magnetic pole body portion 22a.

The bobbins 40, 41 are comprised of the mounting surface side bobbin 40 (engine cover side bobbin) shown in FIG. 3A, and the clamping surface side bobbin 41 (engine body side bobbin) shown in FIG. 3B so as to cover surfaces of the salient pole portions 27 by sandwiching the stator core 21 from both sides as shown in FIGS. 1, 4 and 5. Both the bobbins 40, 41 are made of an insulating synthetic resin material. Each of the bobbins 40, 41 has fifteen winding frame portions 42 to cover the winding frame portions 28 of the stator core 21, flange portions 43 extending outward from a tip of the winding frame portions 42 to cover the magnetic pole body portions 22a and the flange portions 23a of the stator core 21, and a partition portion 44 to prevent connecting wires of the coil 60 wound around the winding frame portions 42 from protruding inside. The flange portions 43 prevent the coil 60 wound around the winding frame portions 42 from being collapsed outside.

Shapes of the bobbins 40, 41 are formed so as to correspond to a shape of the stator core 21 (shown in FIG. 2). In other words, an extension portion 45, which is an area enclosed by broken line in FIGS. 3A and 3B, is formed on the bobbins 40, 41 corresponding to the shape of the stator core 21 having the salient portion 34. In addition, three of the winding frame portions 42 of the bobbins 40, 41 are shorter in radial direction than other winding frame portions. The shorter winding frame portions are corresponding to the specific salient pole portions 27A and referred to as a winding frame portion 42A. The other winding frame portions are corresponding to the normal salient portions 27B and referred to as a winding frame portion 42B. Furthermore, the partition portion 44 is projected outward at the extension portion 45 compared to other areas. Furthermore, an overhang portion 46 is formed on the extension portion 45 of the bobbins 40, 41 corresponding to a shape of the overhang portion 36 formed on the salient portion 34 of the stator core 21. The overhang portion 46 is formed so that both ends of the overhang portion 46 are matched with both ends of the base portions 28a (shown in FIG. 2), which is extending outward by the extension portion 33, of the specific salient pole portions 27A in a circumferential direction along the specific salient pole portions 27A. Consequently, the coil 60, which is wound around the specific salient pole portions 27A, is prevented from being collapsed (shown in FIGS. 4 and 5).

As shown in FIG. 3B, on the partition portion 44 of the clamping surface side bobbin 41, three grooves 47A, 47B, 47C for outgoing wires are formed so as to insert outgoing wires 60a, 60b, 60c, 60a', 60b', 60c' (shown in FIGS. 7 and 8) of the coil 60. In addition, inside the partition portion 44 of the clamping surface side bobbin 41 and near the grooves 47A, 47B, 47C for outgoing wires (i.e. an area including the extension portion 45), a plate like substrate portion 48 is integrally formed with the clamping surface side bobbin 41. The substrate portion 48 is corresponding to the plate portion. On the substrate portion 48, three tubular portions 50A, 50B, 50C are formed to be inserted respectively into three through holes 35A, 35B, 35C provided on the stator core 21. The tubular portions 50A, 50B, 50C are tubular bodies which extend towards a direction of stacking the stator core sheets 22. When two bobbins 40 and 41 are combined, the tubular portions 50A, 50B, 50C are inserted into the through holes 35A, 35B, 35C from the clamping surface side of the stator core 21 to the mounting surface side to cover the inner surfaces of the through holes 35A, 35B, 35C (shown in FIG. 1). In the tubular portions 50A, 50B, 50C which are inserted into the through holes 35A, 35B, 35C, as explained later, lead wires 64A, 64B, 64C, which output the current generated at the generator 1, are inserted (shown in FIGS. 4 and 5). In addition, on the substrate portion 48, three terminal press-fit hole portions 51A, 51B, 51C are formed to press-fit a terminal 53 (shown in FIG. 5) which connects the lead wires 64A, 64B, 63C pulled out of the tubular portions 50A, 50B, 50C with the outgoing wires 60a, 60b, 60c, 60a', 60b', 60c' of the coil inserted into the grooves 47A, 47B, 47C for outgoing wires. The terminal 53 is corresponding to the metal connection terminal. Each of the terminal press-fit hole portions 51A, 51B, 51C is projected to the reverse side of the clamping surface side bobbin 41. When the clamping surface side bobbin 41 is mounted on the stator core 21, the projected portions are fit into three oval hole portions 21a (shown in FIG. 2) provided on the stator core 21.

As explained above, in the present embodiment, the through holes 35A, 35B, 35C are formed on the stator core 21 passing through the stator core 21 in an axis direction of a rotation axis of the rotor, and the lead wires 64A, 64B, 64C for outputting are inserted into the through holes 35A, 35B, 35C. In addition, a plate like substrate portion 48 (corresponding to the plate portion) is extended at a part of the clamping surface side bobbin 41 and inside the partition portion 44. In other words, the substrate portion 48 is integrally formed with the clamping surface side bobbin 41. Since three terminal press-fit hole portions 51A, 51B, 51C are formed on the substrate portion 48, terminal 53 (metal connection terminal) can be press-fitted into the extended portion. The lead wires 64A, 64B, 64C are connected with the outgoing wires 60a, 60b, 60c, 60a', 60b', 60c' (outgoing wires of the coil) via the terminal 53 at one side of the stator core.

Figure 6:
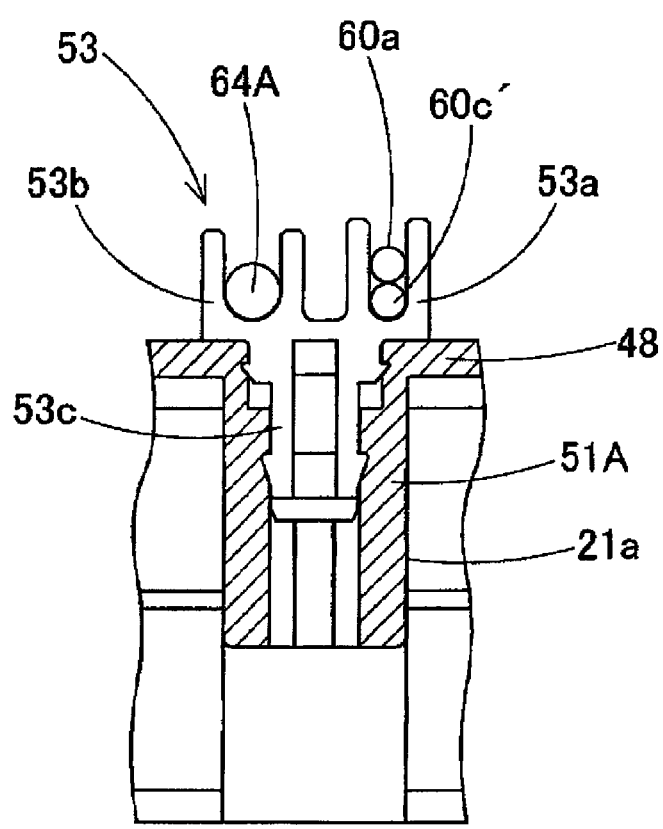
FIG. 6 is a cross-sectional view taken along line VI-VI of FIG. 5.

The terminal 53, which is press-fitted into the terminal press-fit hole portions 51A, 51B, 51C, is made of a conductive metal. As shown in FIGS. 5 and 6, the terminal 53 has a narrow U-shape groove portion 53a that latches two outgoing wires (e.g. 60a and 60c') together, a wide U-shape groove portion 53b that latches a lead wire (e.g. 64A), and a press-fit portion 53c that connects the U-shape groove portions 53a, 53b. The wide U-shape groove portion 53b is corresponding to a lead wire connection end portion. When the press-fit portion 53c of the terminal 53 is fit into the terminal press-fit hole portion (51A in FIG. 6), the narrow U-shape groove portion 53a and the wide U-shape groove portion 53b are projected from the substrate portion 48 of the clamping surface side bobbin 41. The outgoing wires 60a, 60c' latched on the narrow U-shape groove portion 53a and the lead wire 64A latched on the wide U-shape groove portion 53b are soldered to the terminal 53. As a result, the outgoing wires 60a and 60c' are connected with the lead wire 64A.

Figure 7:
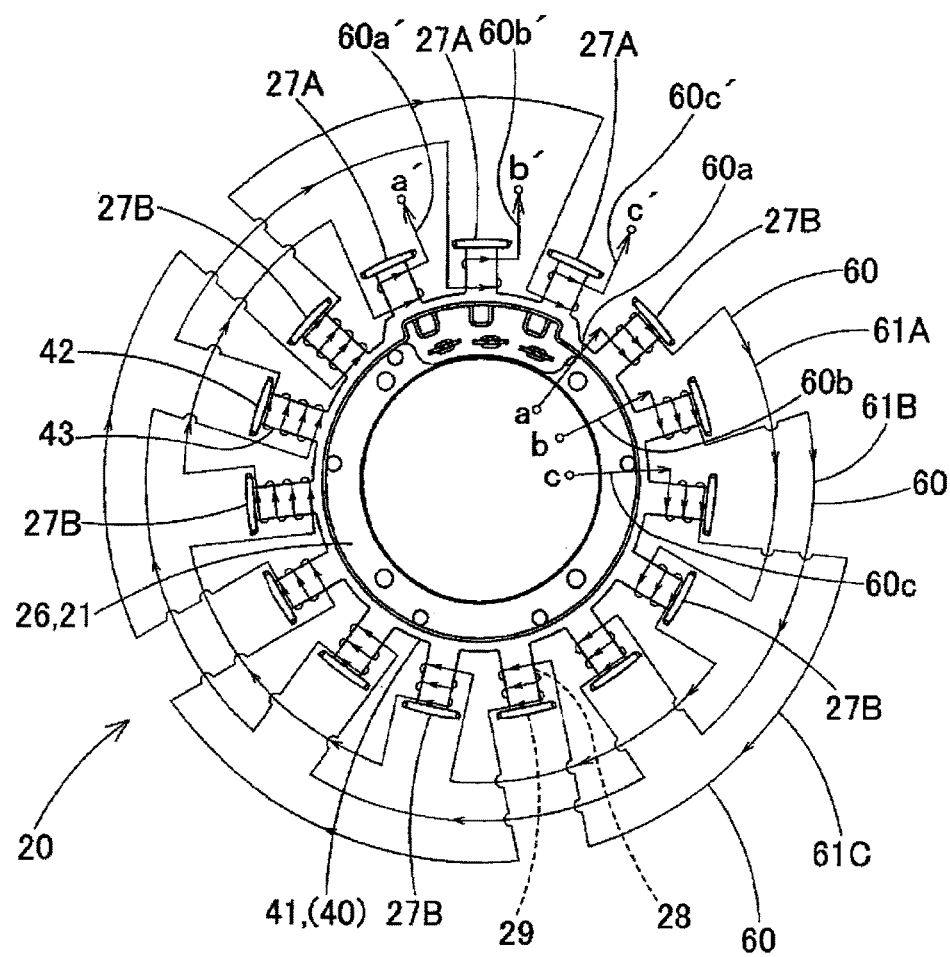
FIG. 7 is a wiring diagram of a coil of the stator.
Figure 8:
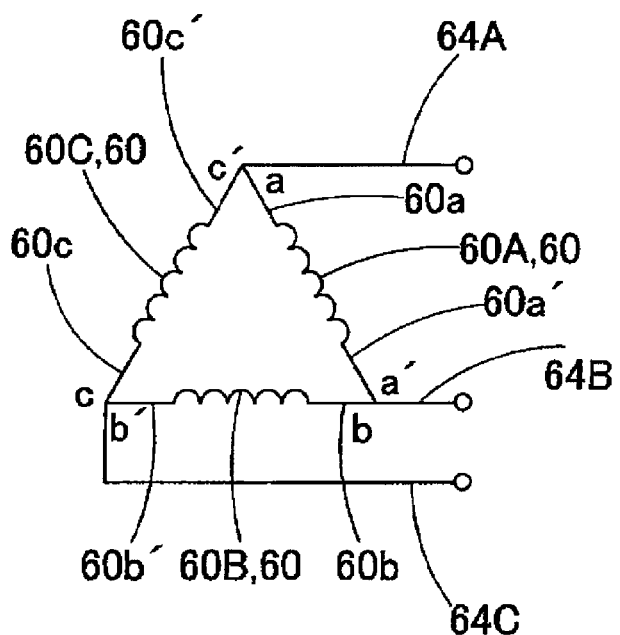
FIG. 8 is an equivalent circuit diagram of the coil.

Here, a wire connection structure will be explained more specifically. As shown in FIGS. 7 and 8, coil groups 60A, 60B, 60C are formed by winding copper wires 61A, 61B, 61C around the winding frame portions 28 of the bobbins 40 and 41. Note that the coil 60 wound around the bobbins 40 and 41 is adhered to the bobbins 40 and 41 by impregnating an epoxy resin.

As shown in FIG. 7, each of the coil groups 60A, 60B, 60C is formed by concentrically winding the copper wires 61A, 61B, 61C from start points a, b and c to end points a', b' and c' respectively in the same direction at every three salient pole portions. As shown in FIG. 8, the coil groups 60A, 60B, 60C are delta-connected to obtain a three-phase output having electrical angle phase difference of 120 degrees.

In other words, in the embodiment, as shown in FIGS. 5 and 8, both the outgoing wire 60a of the coil group 60A and the outgoing wire 60c' of the coil group 60C are inserted into the groove 47A for outgoing wire and soldered to the wide U-shape groove portion 53a (shown in FIG. 6) of the terminal 53 so as to be connected with the lead wire 64A soldered to the wide U-shape groove portion 53b (shown in FIG. 6) of the terminal 53. In addition, both the outgoing wire 60b of the coil group 60B and the outgoing wire 60a' of the coil group 60A are inserted into the groove 47B for outgoing wire and soldered to the narrow U-shape groove portion 53a of the terminal 53 so as to be connected with the lead wire 64B soldered to the wide U-shape groove portion 53b of the terminal 53. In addition, both the outgoing wire 60c of the coil group 60C and the outgoing wire 60b' of the coil group 60B are inserted into the groove 47C for outgoing wire and soldered to the narrow U-shape groove portion 53a of the terminal 53 so as to be connected with the lead wire 64C soldered to the wide U-shape groove portion 53b of the terminal 53. Note that the coil groups 60A, 60B, 60C are corresponding respectively to a U-phase, a V-phase and a W-phase of the three-phase magnet-type generator 1. In addition, the lead wires 64A, 64B, 64C are corresponding respectively to a U-phase, a V-phase and a W-phase of the three-phase magnet-type generator 1.

In the three-phase magnet-type generator 1 of the embodiment, as shown in FIG. 7, the number of coil turns that can be wound around the specific salient pole portions 27A is less compared to the normal salient pole portions 27B. To compensate a shortage of number of turns of the coil 60 to be wound around the specific salient pole portions 27A, the coil 60 is additionally wound around the normal salient pole portions 27B. For example, in case the number of turns of the coil 60 wound around the U-phase of the specific salient pole portions 27A is reduced for twenty turns, the coil should be additionally wound for twenty turns around any of the rest four normal salient pole portions 27B of the U-phase. As for the V-phase and the W-phase, the coil 60 should be wound similarly. Note that the coil 60 does not have to be wound for twenty turns only around one of four normal salient pole portions 27B of the U-phase. For example, five turns can be additionally wound around all of the four normal salient pole portions 27B, or ten turns can be additionally wound around two of the four normal salient pole portions 27B. In any cases, total number of coil turns of the coil 60 that forms the U-phase is configured to be same as that of the V-phase and that of the W-phase so as to equalize the output of each phase. In addition, the number of turns of the coil 60 wound around the specific salient pole portions 27A of the U-phase is configured to be same as that of the V-phase and that of the W-phase. When the generator is a single phase, the coil 60 that cannot be wound around the specific salient pole portions 27A can be wound around any part of the normal salient pole portions 27B without considering the above explained condition.

Figure 14A:
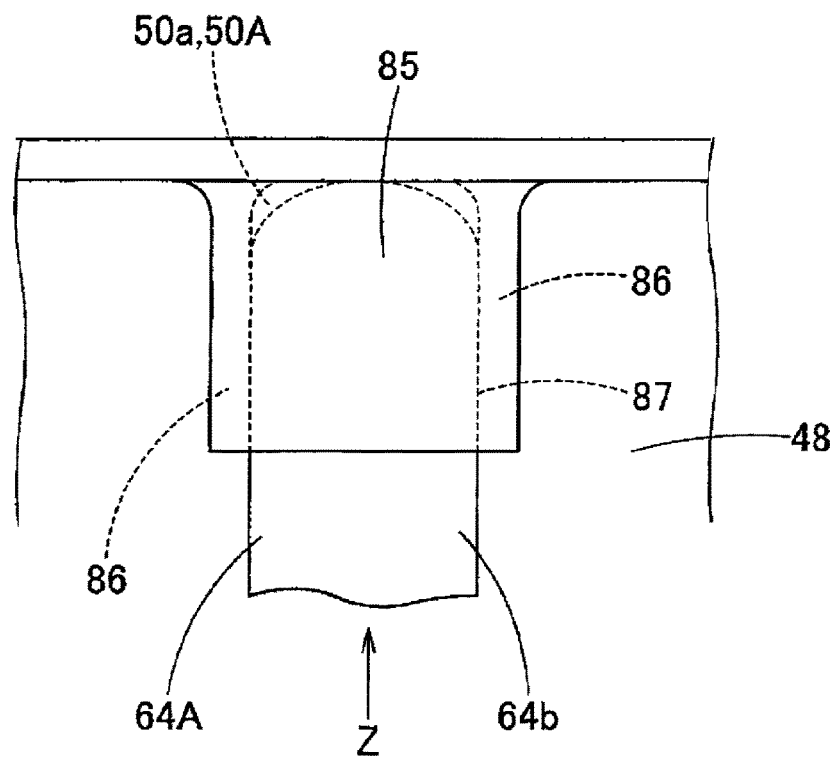
FIG. 14A is a plan view showing a tubular portion provided on the clamping surface side bobbin concerning the fifth variation example.
Figure 14B:
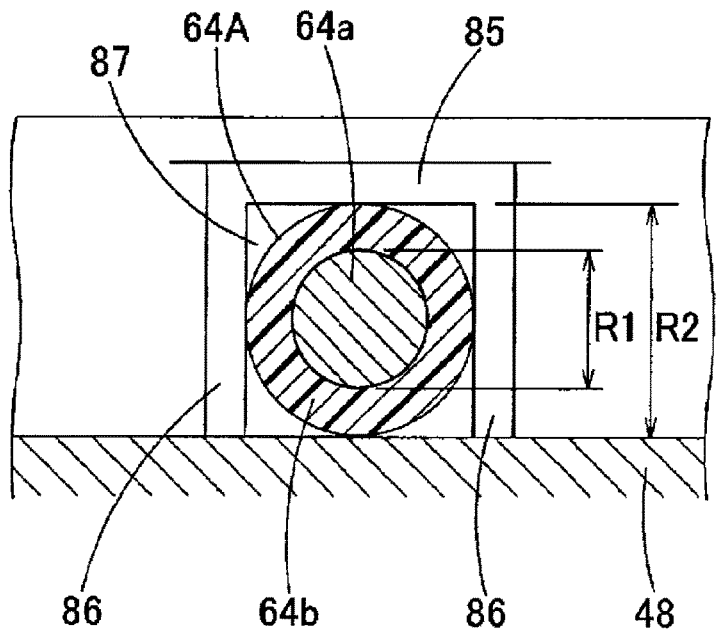
FIG. 14B is a view seen from an arrow Z of FIG. 14A.
Figure 15A:
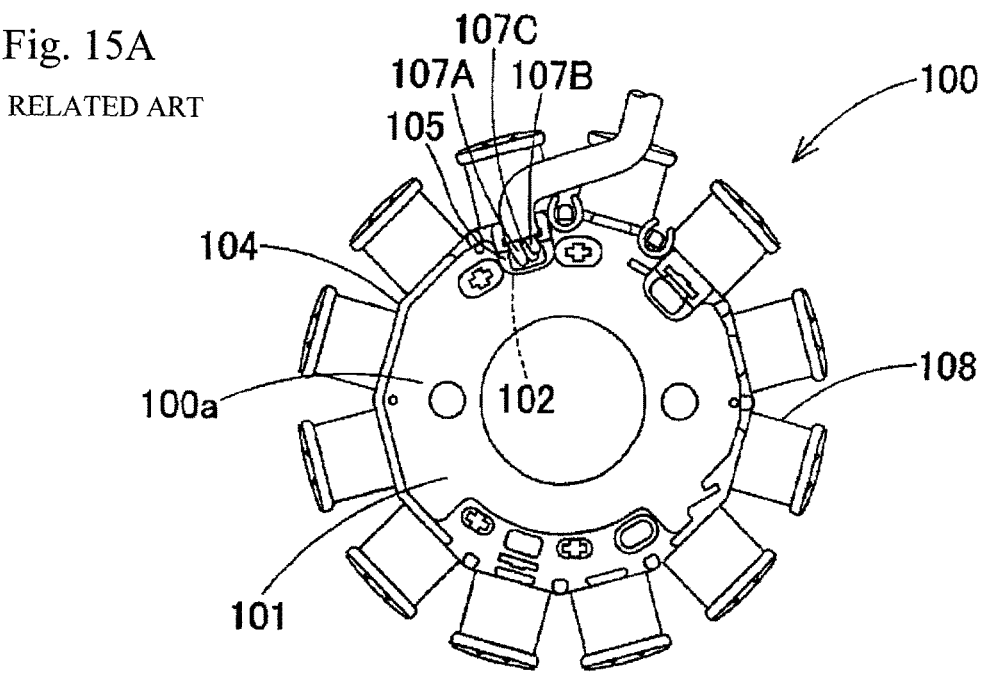
FIG. 15A shows a mounting surface side of a conventional stator.
Figure 15B:
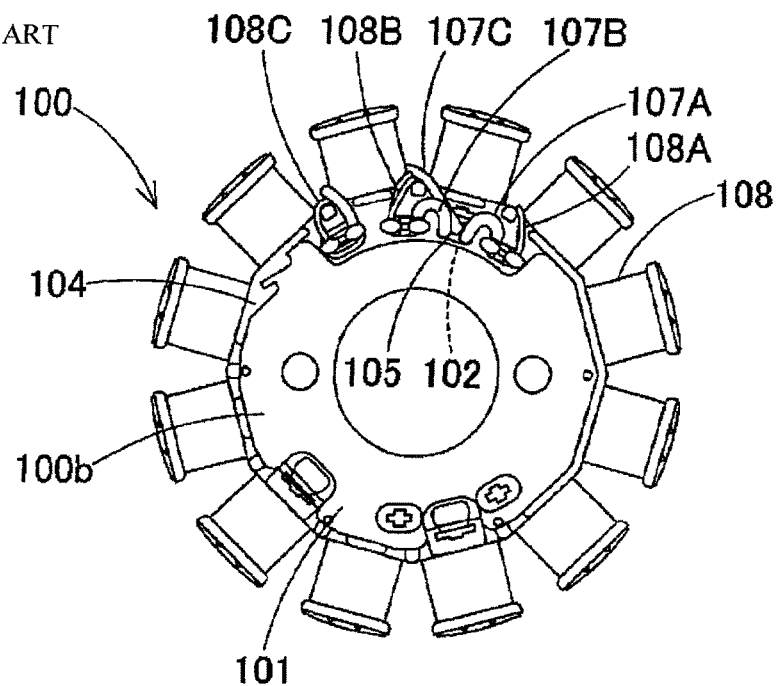
FIG. 15B shows a clamping surface side of the conventional stator.

Next, the lead wires 64A, 64B, 64C will be explained. Each of the lead wires 64A, 64B, 64C is composed of a conducting wire 64a covered by a covering portion 64b made of a synthetic resin. (See the lead wire 64A of the variation example in FIG. 14B.) The lead wires 64A, 64B, 64C are respectively inserted into the through holes 35A, 35B, 35C of the stator core 21 covered by the tubular portions 50A, 50B, 50C of the clamping surface side bobbin 41, from an opening side (side of the engine cover 91) of the rotor 10 as shown in FIGS. 1 and 4, and pulled out to a side of an end portion 11c (side of the engine body 93) of the rotor 10 as shown in FIGS. 1 and 5.

Figure 9:
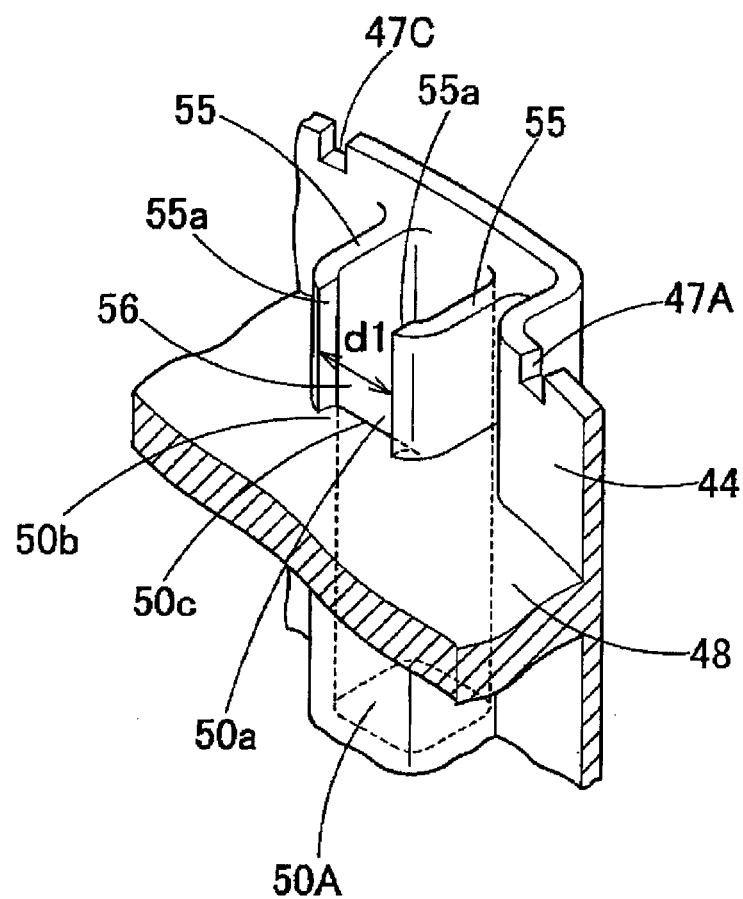
FIG. 9 is a perspective view showing a tubular portion provided on a clamping surface side bobbin.
Figure 10:
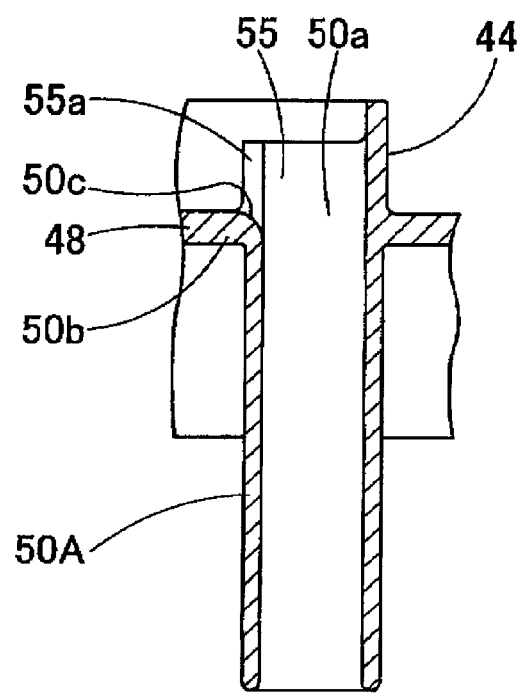
FIG. 10 is a cross-sectional view taken along line X-X of FIG. 3B.

As shown in FIGS. 9 and 10, in the tubular portion (50A in FIG. 9) located at the clamping surface side bobbin 41, a chamfered portion 50c is formed on an outer edge portion 50b (also referred to as an outlet portion 50b) of an outlet 50a at a side of the terminal press-fit hole portion 51A. In the tubular portions 50B, 50C, same as the tubular portion 50A. Therefore, as shown in FIG. 5, when the lead wires 64A, 64B, 64C pulled out of the tubular portions 50A, 50B, 50C are bent towards the terminal press-fit hole portions 51A, 51B, 51C, the covering portion 64b of the lead wires 64A, 64B, 64C are in contact with the chamfered portion 50c (shown in FIGS. 9 and 10). As a result, the covering portion 64b is not damaged by the outer edge portion 50b of the outlet 50a and the conducting wire 64a is prevented from being erroneously exposed.

In addition, as shown in FIGS. 5 and 9, on the clamping surface side bobbin 41, a wall portion 55 is prepared projected from a periphery of the outlet 50a of the tubular portions 50A, 50B, 50C and along with an insertion direction of the lead wires 64A, 64B, 64C. On the wall portion 55, a groove 56 for lead wire is formed by cutting off a side of the terminal press-fit hole portions 51A, 51B, 51C of the wall portion 55. A width dimension d1 (shown in FIG. 9) of the groove 56 for lead wire is equal to a diameter R1 (shown in FIG. 14B) of the conducting wire 64a of the lead wires 64A, 64B, 64C or more, and smaller than a diameter R2 (shown in FIG. 14B) of the covering portion 64b of the lead wires 64A, 64B, 64C. Therefore, when the lead wires 64A, 64B, 64C are inserted into the grooves 56 for lead wire, the covering portion 64b of the lead wires 64A, 64B, 64C are squeezed. In other words, the lead wires 64A, 64B, 64C are clamped at a notched surface 55a (shown in FIG. 9) of the wall portion 55. As a result, the lead wires 64A, 64B, 64C are prevented from rattling or shaking.

In the embodiment, in particular, the notched surface 55a (groove 56 for lead wire) of the wall portion 55 which clamps the lead wires 64A, 64B, 64C is placed near the wide U-shape groove portion 53b of the terminal 53 to which the lead wires 64A, 64B, 64C are soldered. In other words, the place where the lead wires 64A, 64B, 64C are clamped is near the place where the lead wires 64A, 64B, 64C are soldered. Therefore, even when a vehicle such as a motor cycle that mounts the three-phase magnet-type generator 1 of the embodiment is vibrated while driving, the lead wires 64A, 64B, 64C are not rattled at all.

In addition, the lead wires 64A, 64B, 64C are inserted from the clamping surface side to the mounting surface side into the through holes 35A, 35B, 35C provided on the salient portion 34, which is projected outside from the annular base portion 26 of the stator 20. Therefore, as shown in FIG. 4, an annular radiating surface 21b (shown as a shaded area in FIG. 4) is formed on the mounting surface side of the annular base portion 26 of the stator 20, which is a side of the engine cover 91 (clamping surface side). As a result, heat of the coil 60 can be radiated efficiently by the radiating surface.

Although not shown in figures, the three lead wires 64A, 64B, 64C are pulled out of a wire insertion hole provided on the engine cover 91 and connected with electrical circuit components such as a regulator.

As explained above, the magnet-type generator 1 of the embodiment is comprised of the stator 20 that has the stator core 21 and the coil 60, and is fixed on the annular fitting portion 91a (corresponding to a predetermined mount portion) of the engine cover 91; and the rotor 10 that is arranged outside the stator 20 and has a circumferentially arranged magnet 13 so as to generate an alternating flux, wherein the stator core 21 has the annular base portion 26 of approximately annular shape and the salient pole portions 27 extended in a radial direction from the annular base portion 26; the coil 60 is wound around the winding frame portions 28 formed on the salient pole portions 27; the lead wires 64A, 64B, 64C for outputting are inserted into the through holes 35A, 35B, 35C passing through the stator core 21 along a rotation axis of the rotor 10 and connected with the outgoing wires 60a, 60c', 60b, 60a', 60c, 60b' at one side of the stator core 21; the stator core 21 has the extension portion 33, which is partly enlarged outwards from an outer periphery of the annular base portion 26 and fills a part of the gaps 32 between at least two neighboring salient pole portions 27; and the through holes 35A, 35B, 35C are provided on an area (salient portion 34) including the extension portion 33 of the stator core 21.

By using the magnet-type generator 1 of the embodiment, the lead wires 64A, 64B, 64C are inserted into the through holes 35A, 35B, 35C provided on the area (salient portion 34) including the extension portion 33 of the stator core 21, and therefore the lead wires 64A, 64B, 64C for outputting are located away from the center of the stator core 21 than the conventional product. Therefore, as shown in FIG. 1, even when the inner periphery of the annular base portion 26 of the stator core 21 is fit into the annular fitting portion 91a that is projected from the engine cover 91 to the side of the stator core 21, the notch 112 (shown as 112 in FIG. 16 in the conventional example) for releasing the lead wires does not have to be prepared. As a result, manufacturing cost of the engine cover 91 can be reduced, and mounting strength of the stator 20 can be improved because the stator 20 is supported by the annular fitting portion 91a not having the notch. Furthermore, a surface area of the annular base portion 26, which is effective for radiating heat, is increased (shown as a shaded area 21b in FIG. 4). As a result, heat of the coil 60 and the stator core 21 produced when generating electricity can be efficiently radiated and temperature rise of the coil and stator core can be suppressed.

In addition, in the magnet-type generator 1 of the embodiment, because the extension portion 33 is provided, the specific salient pole portions 27A whose winding frame portion 28 is smaller compared to the normal salient portions 27B is formed. Therefore, a part of the coil 60, which cannot be wound around the specific salient pole portions 27A because of an existence of the extension portion 33, is wound around the normal salient pole portions 27B of the same phase as the specific salient pole portions 27A (shown in FIG. 7). In other words, if the extension portion 33 is provided, the specific salient pole portions 27A, which are portions around which smaller number of turns of the coil can be wound compared to the normal salient pole portions 28A (other salient pole portions), are formed, and the coil 60 is additionally wound around the normal salient pole portions 27B of the same phase as the specific salient pole portions 27A in an amount reduced by the existence of the extension portion 33.

Therefore, an amount of the coil 60 is compensated by additionally winding the coil 60 around the normal salient pole portions 27B of the same phase as the specific salient pole portions 27A in an amount reduced by the existence of the extension portion 33. Consequently, power generation performance can be maintained compared to a generator not having the extension portion 33.

In addition, in the magnet-type generator 1 of the embodiment, the overhang portion 36 is provided. The overhang portion 36 is located at the gaps 32 between the specific salient pole portions 27A and the normal salient pole portions (other salient pole portions) 27B, and projected in a direction of enlarging an outer peripheral surface of the annular base portion 26 by an approximately same amount as the extension portion 33 (shown in FIG. 2).

Figure 11A:
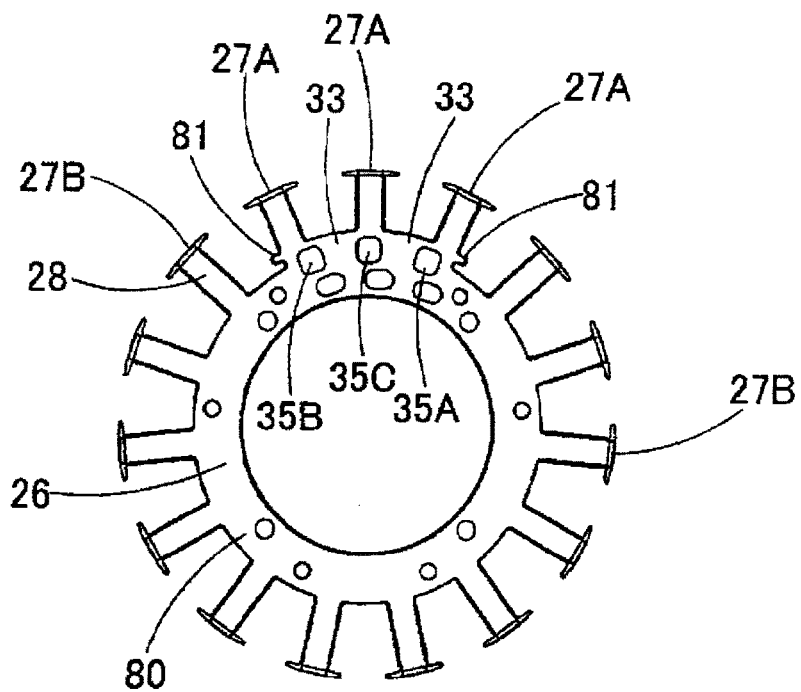
FIG. 11A is a plan view of the core of the stator concerning the first variation example.
Figure 11B:
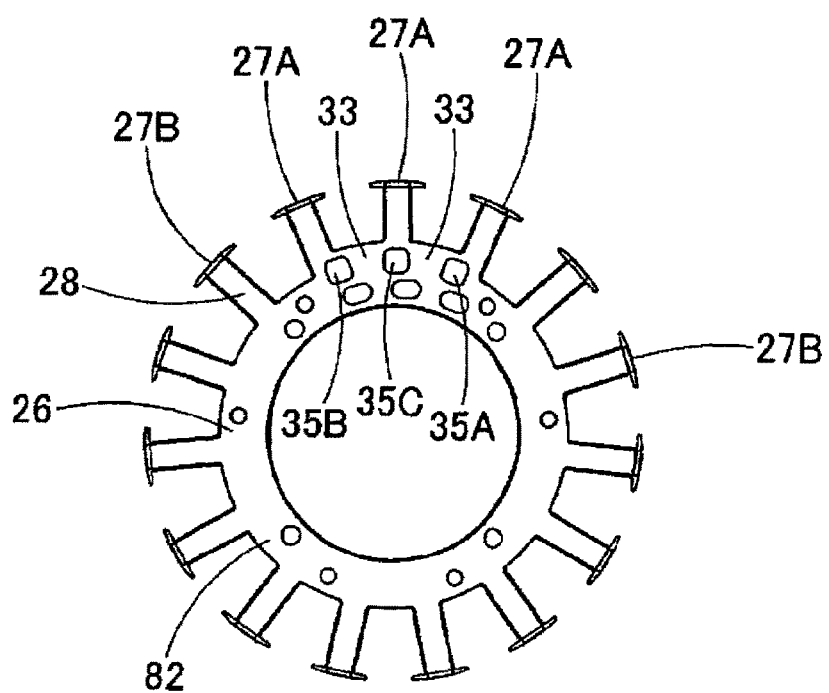
FIG. 11B is a plan view of the core of the stator concerning the second variation example.

If the extension portion 33 is provided on only one side of the salient pole portions 27, the coil 60 is unevenly wound at a side of the annular base portion 26 of the winding frame portions 28 and winding collapse of the coil 60 may occur (shown in a later mentioned variation example of FIG. 11B). However, in the magnet-type generator 1 of the embodiment, the gaps 32 not provided with the extension portion 33 are projected in a direction of enlarging the outer peripheral surface of the annular base portion 26 by an approximately same amount as the extension portion 33, and therefore the coil 60 is evenly wound at the side of the annular base portion 26 of the winding frame portions 28 and winding collapse of the coil 60 can be prevented. In the magnet-type generator 1 of the embodiment, the overhang portion 46 is provided on the clamping surface side bobbin 41 in accordance with the shape of the overhang portion 36 of the stator 20, and winding collapse of the coil 60 is prevented by the overhang portion 46 (shown in FIG. 4). In addition, the magnet-type generator 1 of the embodiment is comprised of the stator 20 that has a stator core 21, the bobbins 40, 41 and the coil 60 wound around the bobbins 40, 41; and the rotor 10 that is arranged outside the stator 20 and has a circumferentially arranged magnet 13 so as to generate an alternating flux, wherein the stator core 21 has the annular base portion 26 of approximately annular shape and the salient pole portions 27 extended in a radial direction from the annular base portion 26; the bobbins 40, 41 are made of an insulating material and mounted on the stator core 21 so as to almost entirely cover a surface of the salient pole portions 27; the stator core 21 has the through holes 35A, 35B, 35C passing through the stator core 21 along a rotation axis of the rotor 10 so that the lead wires 64A, 64B, 64C for outputting, which are corresponding to respective phases, are individually inserted into the through holes 35A, 35B, 35C; the lead wires 64A, 64B, 64C inserted into the through holes 35A, 35B, 35C are connected with the outgoing wires 60a, 60c', 60b, 60a', 60c, 60b' of the coil 60 at one side (clamping surface side) of the stator core 21 via the terminal (metal connection terminal) 53 fixed to the substrate portion (plate portion) 48 extending from the bobbin 41; and the terminal 53 is arranged near the through holes 35A, 35B, 35C.

By using the magnet-type generator 1 of the embodiment, the lead wires 64A, 64B, 64C are inserted into the through holes 35A, 35B, 35C which are prepared separately corresponding to respective phases, and connected with the outgoing wires 60a, 60c', 60b, 60a', 60c, 60b' of the coil 60 via the terminal 53 arranged near the through holes 35A, 35B, 35C, and therefore the lead wires 64A, 64B, 64C inserted into the through holes 35A, 35B, 35C can be soldered with the terminal 53 without arranging the lead wires 64A, 64B, 64C for a long distance (shown in FIG. 5). Consequently, workability of the wire connection can be improved.

In addition, the lead wires 64A, 64B, 64C are soldered with the terminal 53 arranged near the through holes 35A, 35B, 35C, and therefore the vibration resistance of the lead wires 64A, 64B, 64C can be improved compared to a case where the lead wires are pulled out for a long distance and arranged complicatedly.

Furthermore, the lead wires 64A, 64B, 64C are inserted into the through holes 35A, 35B, 35C which are separately prepared corresponding to respective phases, and therefore even when a large size generator is used and relatively large amount of current flows through the lead wires, heat can be prevented from being concentrated on the lead wires 64A, 64B, 64C and deterioration of the covering portion 64b of the lead wires 64A, 64B, 64C can be prevented.

Although some generators employ a structure of using a connecting terminal that passes through a through hole provided on the stator to connect the outgoing wires of the coil on one side of the connecting terminal and connect the lead wires to another side of the connecting terminal, the three-phase magnet-type generator 1 of the embodiment employs a structure of connecting the lead wires 64A, 64B, 64C with the outgoing wires 60a, 60c', 60b, 60a', 60c, 60b' at one side (tightening surface) of the stator core 21. Therefore, even when the size of the stator 20 is changed, the shape of the terminal 53 can be used without change. As a result, manufacturing cost can be reduced and working process can be simplified because soldering is required for only one side.

In addition, in the three-phase magnet-type generator 1 of the embodiment, the wide U-shape groove portion 53b (lead wire connection end portion) of the terminal 53 (metal connection terminal) is arranged along a line connecting the through holes 35A, 35B, 35C and a center of the annular base portion 26 of the stator core 21 (shown in FIG. 5).

Therefore, the lead wires 64A, 64B, 64C inserted into the through holes 35A, 35B, 35C can be soldered with the terminal 53 without bending the lead wires 64A, 64B, 64C complicatedly, and therefore the connection work can be easier.

In addition, in the three-phase magnet-type generator 1 of the embodiment, an inner surface of the through holes 35A, 35B, 35C are covered by the tubular portions 50A, 50B, 50C which are made of an insulating material and provided on the substrate portion 48 (plate portion).

Therefore, the lead wires 64A, 64B, 64C are prevented from directly touching the stator core 21 on which the through holes 35A, 35B, 35C are provided. Consequently, the covering portion 64b (shown in FIG. 14B) of the lead wires 64A, 64B, 64C are prevented from being damaged by a burr of the stator core 21, for example, and short circuit failure between the lead wires 64A, 64B, 64C and the stator core 21 can be prevented.

In addition, in the three-phase magnet-type generator 1 of the embodiment, the tubular portions 50A, 50B, 50C have the chamfered portion 50c formed at least on a side of the terminal 53 (metal connection terminal) of the outlet portion 50b from which the lead wires 64A, 64B, 64C are pulled out (shown in FIG. 9).

Therefore, the lead wires 64A, 64B, 64C inserted into the tubular portions 50A, 50B, 50C are pulled out from the outlet 50a in accordance with the chamfered portion 50c and therefore the lead wires 64A, 64B, 64C can be easily bent toward the terminal 53 to connect the lead wires 64A, 64B, 64C to the terminal 53. In addition, the lead wires 64A, 64B, 64C are bent toward the terminal 53 in accordance with the chamfered portion 50c, and therefore the covering of the lead wires 64A, 64B, 64C are not damaged around the outlet 50a.

In addition, in the three-phase magnet-type generator 1 of the embodiment, the conducting wire 64a of the lead wires 64A, 64B, 64C is covered by the covering portion 64b made of an insulating material (shown in FIG. 14B), and the hole diameter R3 (shown in FIG. 3B) of the tubular portions 50A, 50B, 50C is larger than the diameter R1 (shown in FIG. 14B) of the conducting wire 64a and smaller than the diameter R2 of the lead wires 64A, 64B, 64C including the covering portion 64b.

Therefore, the covering portion 64b of the lead wires 64A, 64B, 64C is pressed against an inner surface of the tubular portions 50A, 50B, 50C and squeezed when the lead wires 64A, 64B, 64C are inserted into the tubular portions 50A, 50B, 50C. Therefore, the lead wires 64A, 64B, 64C are certainly fixed in the tubular portions 50A, 50B, 50C and the vibration resistance of the lead wires 64A, 64B, 64C is improved. Consequently, deterioration of the covering portion 64b, disconnection and short circuit failure, which are caused by the vibration of the lead wires 64A, 64B, 64C, can be prevented.

In addition, in the three-phase magnet-type generator 1 of the embodiment, the tubular portions 50A, 50B, 50C are approximately rectangular shape (shown in FIG. 3B).

Therefore, the covering portion 64b, which is pressed against an inner surface of the tubular portions 50A, 50B, 50C, can be released toward the corner of the tubular portions 50A, 50B, 50C whose holes are rectangular shape. As a result, the lead wires 64A, 64B, 64C can be easily inserted compared to a hole that the pressed covering portion 64b cannot be released. Note that a shape of the hole is not limited to rectangular as long as the shape is a polygonal shape.

In addition, in the three-phase magnet-type generator 1 of the embodiment, the wall portion 55, which is projected from a periphery of the outlet 50a of the tubular portions 50A, 50B, 50C along with an insertion direction of the lead wires 64A, 64B, 64C, is provided on the substrate portion (plate portion) 48, and the grooves 56 for lead wire, which have a smaller diameter than the diameter R2 (shown in FIG. 14B) of the lead wires 64A, 64B, 64C, are formed on the wall portion 55 (shown in FIG. 9).

Therefore, the lead wires 64A, 64B, 64C can be held by the wall portion 55 by fitting the lead wires 64A, 64B, 64C pulled out of the outlet 50a of the tubular portions 50A, 50B, 50C into the grooves 56 for lead wire and then soldering the lead wires 64A, 64B, 64C to the terminal 53. As a result, the lead wires 64A, 64B, 64C are prevented from rattling and vibration resistance of the lead wires 64A, 64B, 64C can be improved. The shorter a distance between the position of the terminal to which the lead wires 64A, 64B, 64C are soldered and the grooves 56 for lead wire on which the lead wires 64A, 64B, 64C are fixed, the more efficiently the vibration of the lead wires 64A, 64B, 64C can be suppressed.

In addition, in the three-phase magnet-type generator 1 of the embodiment, only one phase of the lead wires 64A, 64B, 64C is inserted into one of the through holes 35A, 35B, 35C. Therefore, even when thick lead wires are used to form a relatively large generator used in large motorcycles, the respective lead wires 64A, 64B, 64C can be certainly and individually fixed compared to a case when lead wires of plural phases are pulled out of one through hole.

2. Variation Examples

Hereafter, variation examples are explained. In the explanation of the variation examples below, components in common with those in the embodiment of the three-phase magnet-type generator 1 are denoted by the same symbols.

The overhang portion 36 of the stator core 21 is formed to extend from the specific salient pole portions 27A and the annular base portion 26 in the three-phase magnet-type generator 1 of the embodiment (shown in FIG. 2). However, the overhang portion 36 can be formed to extend only from the specific salient pole portions 27A as shown in FIG. 11A as an overhang portion 81 of a stator core 80.

In addition, overhang portions 36 and 46 are provided both on the stator core 21 and on the bobbins 40 and 41 in the three-phase magnet-type generator 1 of the embodiment (shown in FIGS. 2 and 3). However, the stator core 82 can be formed without having the overhang portion 36 and only the bobbins 40 and 41 can have the overhang portion 46 as shown in FIG. 11B.

Figure 12:
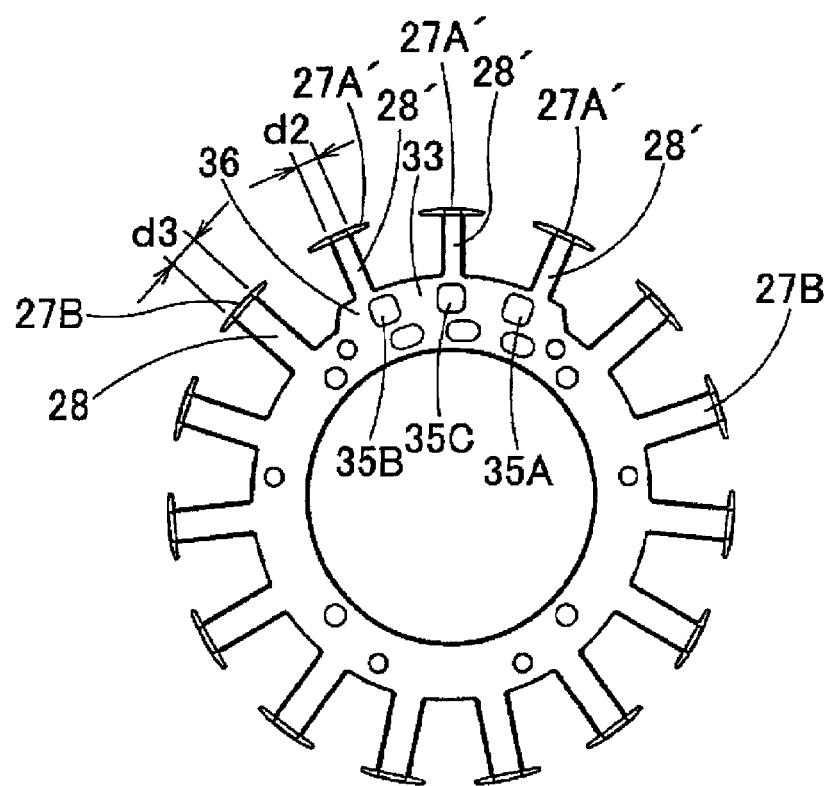
FIG. 12 is a plain view of the core of the stator concerning the third variation example.

In addition, the number of turns of the coil 60 wound around the normal salient pole portions 27B is more than that of the specific salient pole portions 27A of the same phase in the embodiment (shown in FIG. 7). However, the number of turns of the coil 60 can be same between a specific salient pole portions 27A' and the normal salient pole portions 27B as shown in FIG. 12. It can be realized by specifying a width dimension d2, which is along a circumferential direction, of winding frame portions 28' of the specific salient pole portions 27A', to be narrower than a width dimension d3, which is along a circumferential direction of winding frame portions 28 of the normal salient pole portions 27B so that same number of coil turns of the coil 60 as the normal salient pole portions 27B can be wound around the winding frame portions 28' of the specific salient pole portions 27A', which is specified to be narrower. In other words, when the specific salient pole portions 27A' around which smaller number of turns of the coil can be wound is provided on the three-phase magnet-type generator 1, the width dimension of the winding frame portions 28' of the specific salient pole portions 27A' can be specified to be narrower than that of the winding frame portions 28 of the normal salient pole portions 27B. By using such a structure, an amount of the coil 60 that can be wound around the winding frame portions 28' increases because the width dimension of the winding frame portions 28' of the specific salient pole portions 27A' becomes narrower. Therefore, an amount of the coil 60 wound around the specific salient pole portions 27A, which is reduced by the existence of the extension portion 33, is compensated. As a result, power generation performance can be maintained compared to a generator not having the extension portion 33.

Figure 13A:
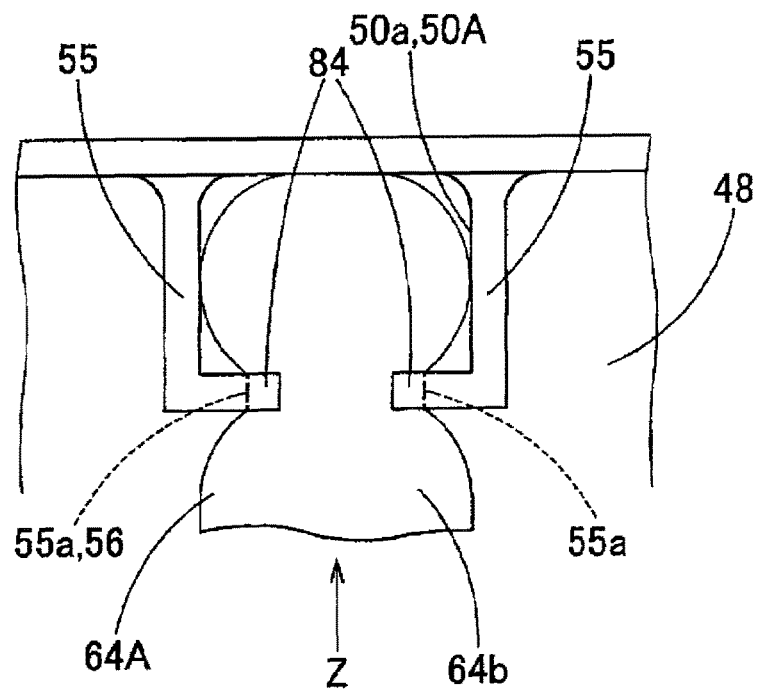
FIG. 13A is a plan view showing a tubular portion of the clamping surface side bobbin concerning the fourth variation example.
Figure 13B:
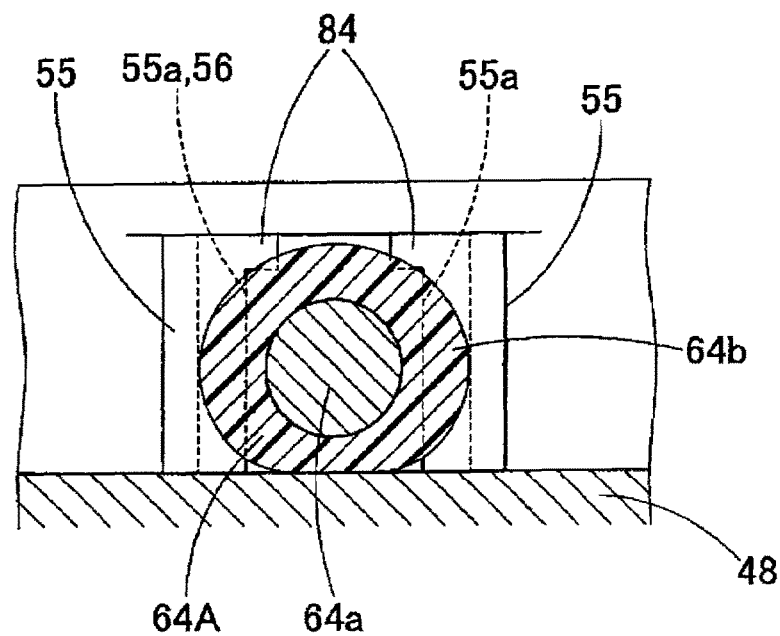
FIG. 13B is a view seen from an arrow Z of FIG. 13A.

In addition, only the grooves 56 for lead wire are formed on the wall portion 55 projected from a periphery of the outlet 50a of the tubular portions 50A, 50B, 50C (shown in FIG. 9) in the three-phase magnet-type generator 1 of the embodiment. However, in addition to the lead wire 56 formed on the wall portion 55 projected from a periphery of the outlet 50a of the tubular portions 50A, an uplift prevention portion 84 can be formed projected from the upper part of the notched surface 55a of the wall portion 55 to the direction of the grooves 56 for lead wire to prevent the read wire 64A from being lifted up from the substrate portion 48 as shown in FIGS. 13A and 13B. By using such a structure, the uplift prevention portion 84 prevents the lead wires 64A, 64B, 64C pulled out of the outlet 50a of the tubular portions 50A, 50B, 50C from being lifted up from the substrate portion 48 of the stator 20. As a result, vibration resistance of the lead wires 64A, 64B, 64C can be improved.

A shape of the uplift prevention portion 84 is not limited to the shape shown in FIGS. 13A and 13B. For example, as shown as an uplift prevention portion 85 in FIGS. 14A and 14B, the uplift prevention portion 85 can be projected from a wall portion 86 to cover an opening that is along the insertion direction of the lead wire 64A. Note that, in the variation example shown in FIGS. 14A and 14B, a width dimension of grooves 87 for lead wire formed by the wall portion 86 is specified to be larger than the diameter R2 of the lead wire 64A so that the lead wire 64A is easily pulled out of the outlet 50a of the tubular portions 50A.

In addition, the entire coil 60 that cannot be wound around the specific salient pole portions 27A is wound around the normal salient pole portions 28B in the three-phase magnet-type generator 1 of the embodiment. However, a part of the coil 60 that cannot be wound around the specific salient pole portions 27A can be wound around the normal salient pole portions 27B. In addition, by combining the specific salient pole portions 27A' having a narrow width dimension shown in FIG. 12, a part the coil 60 that cannot be wound around the specific salient pole portions 27A can be wound around the normal salient pole portions 27B and another part of the coil 60 can be wound around the narrower salient pole portions 27A' to entirely compensate the reduced number of turns of the coil 60. By using such a structure, a desired power generation can be performed without excessively narrowing the width dimension of the winding frame portions 28 of the specific salient portion 27A and without excessively thickening the normal salient portion 27B by the coils 60 additionally wound.

In addition, the bobbins 40 and 41 made of an insulating synthetic resin material are provided in the three-phase magnet-type generator 1 of the embodiment. However, without providing the bobbins 40 and 41, a powder resin coating layer, which is made of an epoxy resin, can be provided on the surface of the salient portion 27 of the stator core 21. By using such a structure, radiation performance can be improved compared to the case of using the bobbins 40 and 41.

In addition, although the magnet-type generator 1 of the embodiment is explained as three-phase, it can be applied to the generator other than three-phase, such as a five-phase generator.

Note that "annular base portion of approximately annular shape" in the claims includes the annular base portion 26 which has an angular part on its outer peripheral edge. For example, the annular base portion 26 having dodecagonal outer peripheral edge is included.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. A magnet-type generator, comprising:
a stator that has a stator core, a bobbin and a coil wound around the bobbin; and
a rotor that is arranged outside the stator and has a circumferentially arranged magnet so as to generate an alternating flux, wherein
the stator core has an annular base portion of approximately annular shape and salient pole portions extended in a radial direction from the annular base portion;
the bobbin is made of an insulating material and mounted on the stator core so as to almost entirely cover a surface of the salient pole portions;
the stator core has through holes passing through the stator core parallel to a rotation axis of the rotor so that lead wires for outputting current generated at the magnet-type generator are individually inserted into the through holes, the lead wires corresponding to respective phases;
the lead wires inserted into the through holes are connected with outgoing wires of the coil at one side of the stator core via a metal connection terminal fixed to a plate portion extending from the bobbin;
the metal connection terminal is arranged near the through holes, and each of the lead wires are bent only once at exits of the through holes toward the metal connection terminals.

2. The magnet-type generator according to claim 1, wherein
each of lead wire connection end portions of the metal connection terminals is placed on a line between each of the through holes and a center of the inner bore portion which is located inside the annular base portion and the center of the inner bore portion is a position defined in a plan view of the inner bore portion.

3. The magnet-type generator according to claim 1, wherein
an inner surface of the through holes is covered by a tubular portion which is made of an insulating material and provided on the plate portion.

4. The magnet-type generator according to claim 3, wherein
the tubular portion has a chamfered portion formed at least on a side of the metal connection terminal of an outlet portion from which the lead wires are pulled out.

5. The magnet-type generator according to claim 3, wherein
a conducting wire of the lead wires is covered by a covering portion made of an insulating material; and
a hole diameter of the tubular portion is larger than a diameter of the conducting wire and smaller than a diameter of the lead wires including the covering portion.

6. The magnet-type generator according to claim 5, wherein
a hole of the tubular portion has a polygonal shape.

7. The magnet-type generator according to claim 3, wherein
the plate portion has a wall portion projecting from a periphery of the outlet of the tubular portion and parallel to an insertion direction of the lead wires; and
a groove for lead wire having a width dimension smaller than the diameter of each of the lead wires is formed on the wall portion.

8. The magnet-type generator according to claim 7, wherein
an uplift prevention portion is formed on the wall portion to prevent the lead wires from being lifted up from the plate portion.

9. A magnet-type generator, comprising:
a stator fixed on a predetermined mount portion; and
a rotor that is arranged outside the stator, has a circumferentially arranged magnet, and is fixed on a predetermined rotation axis so as to be rotated; wherein
the stator has
a stator core that has an annular base portion of approximately annular shape made of a magnetic body and salient pole portions extended outside in a radial direction from the annular base portion,
a bobbin that is made of an insulating material and almost entirely covers a surface of the salient pole portions; and
a coil wound around the bobbin;
the magnet is circumferentially arranged on the rotor so as to generate an alternating flux at an outside of the salient pole portions of the stator core;
the stator core has through holes passing through the stator core parallel to a rotation axis of the rotor so that lead wires for outputting current generated at the magnet-type generator are inserted into the through holes and connected with outgoing wires of the coil at one side of the stator core via a metal connection terminal press-fitted into an extended portion extended from the bobbin.

* * * * *